United States Patent
Lee et al.

(10) Patent No.: US 10,447,785 B2
(45) Date of Patent: Oct. 15, 2019

(54) DIGITAL DEVICE AND METHOD FOR CONTROLLING SAME

(71) Applicant: LG ELECTRONICS INC., Seoul (KR)

(72) Inventors: Doyoung Lee, Seoul (KR); Sihwa Park, Seoul (KR); Sinae Chun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 175 days.

(21) Appl. No.: 15/527,310

(22) PCT Filed: Nov. 17, 2014

(86) PCT No.: PCT/KR2014/011022
§ 371 (c)(1),
(2) Date: May 16, 2017

(87) PCT Pub. No.: WO2016/080561
PCT Pub. Date: May 26, 2016

(65) Prior Publication Data
US 2017/0339231 A1    Nov. 23, 2017

(51) Int. Cl.
*H04L 12/12*    (2006.01)
*H04L 29/08*    (2006.01)
(Continued)

(52) U.S. Cl.
CPC ............ *H04L 67/125* (2013.01); *G08C 17/02* (2013.01); *H04L 12/12* (2013.01); *H04L 12/282* (2013.01);
(Continued)

(58) Field of Classification Search
None
See application file for complete search history.

(56) References Cited

U.S. PATENT DOCUMENTS 9,839,165 B2 * 12/2017 Endo ............... H05K 7/20745
2004/0163001 A1 * 8/2004 Bodas ................... G06F 1/206
713/300

(Continued)

FOREIGN PATENT DOCUMENTS

WO        2014051634        4/2014

OTHER PUBLICATIONS

PCT International Application No. PCT/KR2014/011022, Written Opinion of the International Searching Authority dated Jul. 28, 2015, 23 pages.

*Primary Examiner* — Jason Lin
(74) *Attorney, Agent, or Firm* — Lee, Hong, Degerman, Kang & Waimey

(57) ABSTRACT

A method for controlling a digital device according to one embodiment of the present specification may comprise the steps of: detecting a first control input for executing a first operation which is associated with a first configuration value and which is executable by utilizing a main device; transmitting, to the main device, a first triggering signal for executing the first operation on the basis of the first control input; detecting a second control input for executing a first operation which is associated with a second configuration value and which is not executable by utilizing the main device alone; detecting a cooperative device associated with the first operation; and providing a notification for the cooperative device.

19 Claims, 13 Drawing Sheets

(51) Int. Cl.
*H04L 12/28* (2006.01)
*G08C 17/02* (2006.01)
*H04W 4/70* (2018.01)

(52) U.S. Cl.
CPC ........... *H04L 12/2803* (2013.01); *H04W 4/70* (2018.02); *G08C 2201/93* (2013.01); *H04L 2012/285* (2013.01); *H04L 2012/2841* (2013.01)

(56) References Cited

U.S. PATENT DOCUMENTS

| | | | |
|---|---|---|---|
| 2006/0219842 A1* | 10/2006 | Shell | B64D 13/06 244/118.5 |
| 2009/0138313 A1* | 5/2009 | Morgan | G06Q 10/06 705/7.23 |
| 2009/0238099 A1 | 9/2009 | Ahmavaara | |
| 2011/0257794 A1* | 10/2011 | Nishino | F24F 11/30 700/277 |
| 2012/0166538 A1 | 6/2012 | Son et al. | |
| 2012/0190292 A1* | 7/2012 | Skrepcinski | F24F 7/007 454/258 |
| 2012/0306661 A1 | 12/2012 | Kue et al. | |
| 2013/0282185 A1* | 10/2013 | Nishimura | G05D 23/1919 700/276 |
| 2014/0244768 A1 | 8/2014 | Shuman et al. | |

\* cited by examiner

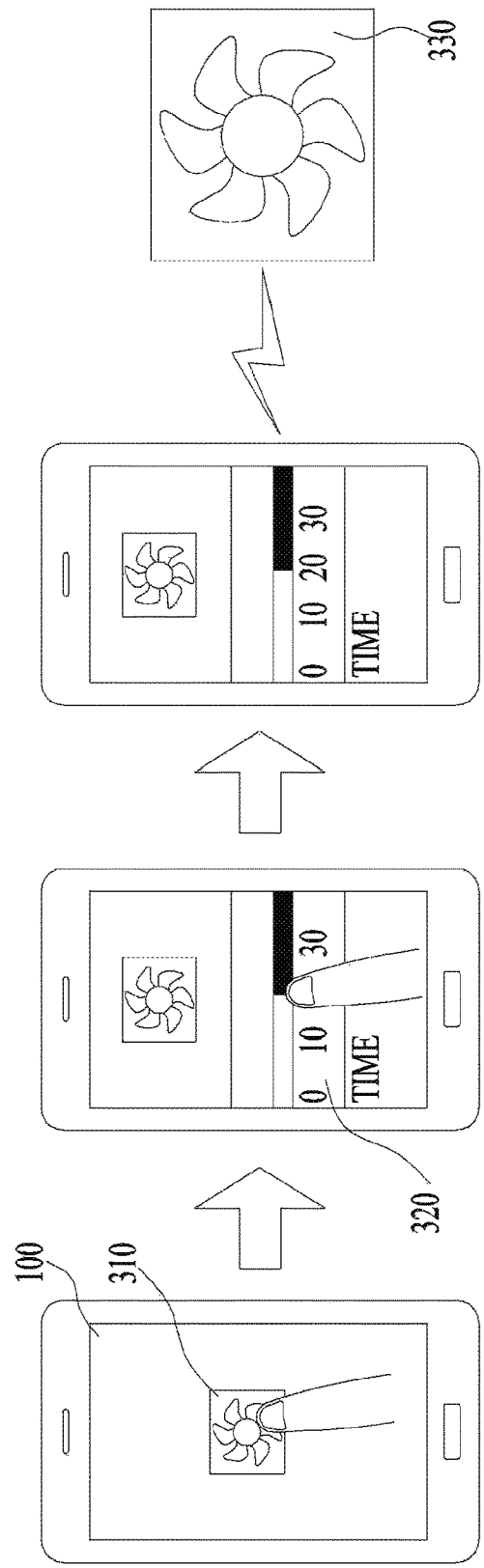

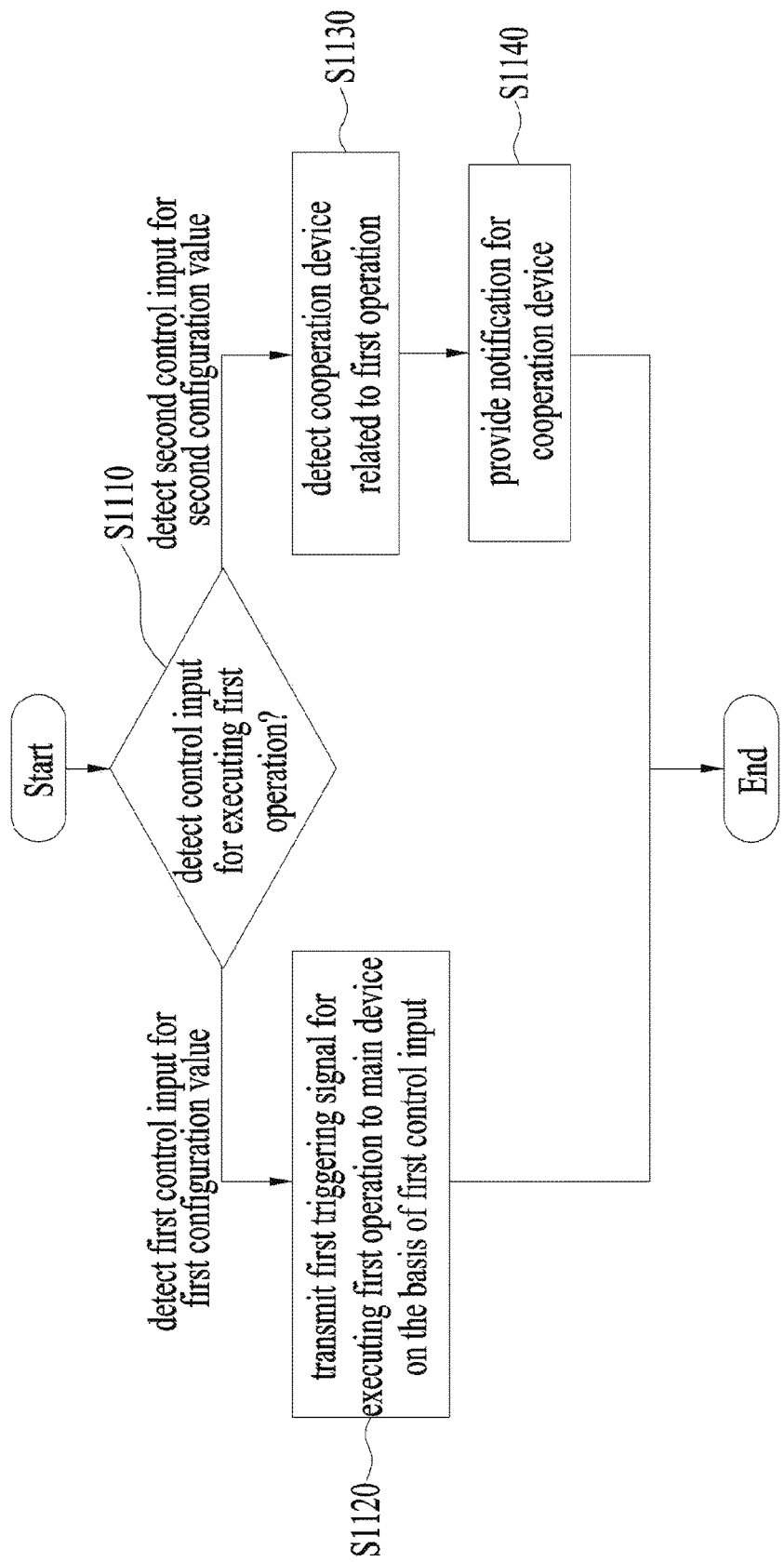

DIGITAL DEVICE AND METHOD FOR CONTROLLING SAME

CROSS-REFERENCE TO RELATED APPLICATIONS

This application is the National Stage filing under 35 U.S.C. 371 of International Application No. PCT/KR2014/011022, filed on Nov. 17, 2014, the contents of which are all hereby incorporated by reference herein in its entirety.

TECHNICAL FIELD

The present specification relates to a digital device and a method for controlling the same.

BACKGROUND ART

Recently, with the development of IoT (Internet of Things), communication with various devices has become possible. More specifically, with the development of communication technologies, machine to machine (MtoM) has been upgraded to IoT based on Internet. In this respect, users may receive surrounding information sensed by various surrounding devices through communication. Also, the users may desire to change a surrounding environment to a desired environment by controlling various devices on the basis of the sensed surrounding information.

DISCLOSURE

Technical Problem

An object of the present specification is to provide a digital device and a method for controlling the same.

Also, another object of the present specification is to provide an IoT system that comprises a digital device, a main device and a cooperation device.

Also, still another object of the present specification is to provide a method for detecting a control input for executing a first operation in a digital device and delivering a triggering signal to a main device or a cooperation device on the basis of the detected control input.

Also, further still another object of the present specification is to provide a digital device that provides a notification related to a cooperation device on the basis of a configuration value for executing a first operation.

Also, further still another object of the present specification is to provide a method for selecting a cooperation device on the basis of operation attributes of a first operation in a digital device.

Also, further still another object of the present specification is to provide a method for displaying an interface for a first operation in a digital device.

Also, further still another object of the present specification is to provide a method for displaying an interface for a main device and a cooperation device in a digital device.

Also, further still another object of the present specification is to provide a method for executing a first operation through cooperation between a main device and a cooperation device in an IoT system.

Also, further still another object of the present specification is to provide a method for sensing surrounding environment information by using a main device and a cooperation device in an IoT system.

Technical Solution

A digital device may be provided in accordance with one embodiment of the present specification. At this time, the digital device comprises a communication unit for exchanging information with external devices including at least one main device and at least one cooperation device; a display unit for displaying visual information; a control input sensing unit for detecting a control input and delivering the detected control input to a processor; and the processor for controlling the communication unit, the display unit and the control input sensing unit. In this case, the processor may transmit a first triggering signal for executing a first operation to the main device if the detected control input is intended to execute the first operation and the control input for a first configuration value which is executable using the main device is detected, and may detect the cooperation device related to the first operation and provide a notification for the cooperation device if the control input for a second configuration value which is not executable using the main device only is detected.

A method for controlling a digital device in accordance with one embodiment of the present invention comprises the steps of detecting a first control input for executing a first operation for a first configuration value which is executable using a main device; transmitting a first triggering signal for executing the first operation to the main device on the basis of the first control input; detecting a second control input for executing the first operation for a second configuration value which is not executable using the main device only; detecting a cooperation device related to the first operation; and providing a notification for the cooperation device.

Advantageous Effects

The present specification may provide a digital device and a method for controlling the same.

Also, according to the present specification, an IoT system may comprise a digital device, a main device and a cooperation device.

Also, according to the present specification, a digital device may detect a control input for executing a first operation and deliver a triggering signal to a main device or a cooperation device on the basis of the detected control input.

Also, according to the present specification, a digital device may provide a notification related to a cooperation device on the basis of a configuration value for executing a first operation.

Also, according to the present specification, a digital device may select a cooperation device on the basis of operation attributes of a first operation.

Also, according to the present specification, a digital device may display an interface for a first operation.

Also, according to the present specification, a digital device may display an interface for a main device and a cooperation device.

Also, according to the present specification, an IoT system may execute a first operation through cooperation between a main device and a cooperation device.

Also, according to the present specification, an IoT system may sense surrounding environment information by using a main device and a cooperation device.

BRIEF DESCRIPTION OF THE DRAWINGS

FIGS. 3a and 3b are views illustrating a method for controlling a first operation on the basis of a configuration value in a digital device in accordance with one embodiment of the present specification.

FIG. 11 is a view illustrating a method for controlling a digital device in accordance with one embodiment of the present specification.

BEST MODE FOR CARRYING OUT THE INVENTION

Hereinafter, although the embodiments of the present specification will be described in detail with reference to the accompanying drawings and the disclosure described by the drawings, it is to be understood that claims of the present specification are not limited by such embodiments.

Although the terms used in this specification are selected from generally known and used terms considering their functions in the present specification, the terms may be modified depending on intention of a person skilled in the art, practices, or the advent of new technology. Also, in special case, the terms mentioned in the description of the present specification may be selected by the applicant at his or her discretion, the detailed meanings of which are described in relevant parts of the description herein. Accordingly, the terms used herein should be understood not simply by the actual terms used but by the meaning lying within and the description disclosed herein.

Although the terms such as "first" and/or "second" in this specification may be used to describe various elements, it is to be understood that the elements are not limited by such terms. The terms may be used to identify one element from another element. For example, the first element may be referred to as the second element, and vice versa within the range that does not depart from the scope of the present specification.

In the specification, when a part "comprises" or "includes" an element, it means that the part further comprises or includes another element unless otherwise mentioned. Also, the term " . . . unit" or " . . . module" disclosed in the specification means a unit for processing at least one function or operation, and may be implemented by hardware, software or combination of hardware and software.

Figure 1:
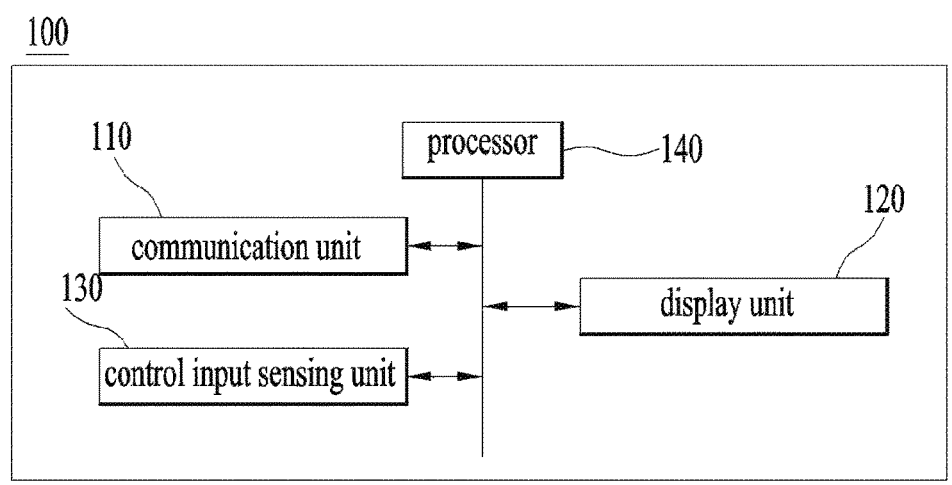
FIG. 1 is a block diagram illustrating a digital device according to one embodiment of the present specification.

FIG. 1 is a block diagram illustrating a digital device according to one embodiment of the present specification. At this time, the digital device 100 may be a device that may execute communication with another device 100. In more detail, a device that may exchange a triggering signal for operation execution with another device 100 may be the digital device 100. For example, the digital device 100 may be a smart phone, a smart pad, an HMD, a smart watch, a notebook computer, or a remote controller. Also, the digital device may be a wearable device worn by a user and capable of communication with another device. That is, a device that exchanges information on device control may be the digital device 100, and the digital device 100 is not limited to the aforementioned examples.

The digital device 100 may comprise a communication unit 110, a display unit 120, a control input sensing unit 130, and a processor 140. Also, the digital device 100 may further comprise a sensor unit (not shown) as an optional element. For example, the respective units may be elements or parts constituting the portable device 100. That is, each unit may be an independent unit housed to allow the portable device 100 to execute its function, and is not limited to the aforementioned example.

Also, a first operation may be an operation executed by at least one of external devices. At this time, the first operation may be an operation of which execution is controlled by the digital device 100. At this time, if the digital device 100 detects a control input for selecting the first operation, a device, which may execute the first operation, among the external devices may be configured as a main device. Also, a cooperation device may be an external device that may execute a sub-operation related to the first operation. That is, the first operation may be selected based on the control input controlled by the digital device 100. Also, the main device and the cooperation device may be configured based on the first operation.

The communication unit 110 may be controlled by the processor 140. At this time, the communication unit 110 may perform communication with an external device using various protocols and thus transmit and receive data. At this time, the external device 100 may be at least one main device or at least one cooperation device. At this time, the main device may be a device in which the first operation is executed. Also, the cooperation device may be a device that executes a second operation related to the first operation. At this time, the main device and the cooperation device may be configured differently from each other by an operation device. In more detail, for example, if the first operation is a cooling operation, the main device may be an air-conditioner. At this time, the cooperation device may be a hygrometer, a fan, a window, or the like, which affects cooling. For another example, if the first operation is a dehumidification operation, the main device may be a hygrometer. At this time, the cooperation device may be a clothes dryer, an air-conditioner, or the like. That is, the main device and the cooperation device may be modified to be determined by the operation. That is, the external device means surrounding devices that perform communication with the digital device 100, and is not limited to the aforementioned examples.

Also, the communication unit 110 may transmit and receive digital data such as content by accessing a network in a wire or wireless manner. In more detail, the communication unit 110 may transmit a triggering signal from the external device. At this time, the triggering signal may be a signal for operation execution based on the control input detected from the digital device 100. At this time, the external device may execute an operation on the basis of the received triggering signal. Also, the communication unit 110 may receive surrounding environment information from the external devices. At this time, for example, the surrounding environment information may be information collected from a temperature sensor, a humidity sensor, a thermo sensor, a gas sensor, an illumination sensor, and an ultrasonic sensor. For another example, the surrounding environment information may be information extracted from a surrounding environment through a remote sensor, SAR, radar position sensor, motion sensor, an image sensor, etc. That is, the digital device 100 may receive information sensed by the external devices by using the communication unit 110, and may control the surrounding environment by using the received information.

The display unit 120 may be controlled by the processor 140. At this time, the display unit 120 may include at least one of an organic light emitting diode (OLED), a liquid crystal display (LCD), an electronic ink, a head mounted display (HMD), and a flexible display. The display unit 120 may display execution information for the operation. Also, the display unit 120 may display information on the main device and the cooperation device. Also, the display unit 120 may display an interface and an indicator for operation execution. That is, the display unit 120 may display visual information. As a result, a user may acquire information on operation execution.

The control input sensing unit 130 may deliver a user input or an environment recognized by the digital device to the processor 140 by using at least one sensor mounted in the digital device 100. In more detail, the control input sensing unit 130 may sense a control input of the user by using at least one sensor mounted in the digital device 100. In this case, at least one sensing means may include various sensing means for sensing the control input, such as a touch sensor, a fingerprint sensor, a motion sensor, a proximity sensor, an illumination sensor, a voice recognition sensor, and a pressure sensor. The control input sensing unit 130 refers to the aforementioned various sensing means, and the aforementioned sensors may be included in the digital device 100 as separate elements or may be included in the digital device by being incorporated as at least one or more elements. That is, the control input sensing unit 130 may be a unit for sensing the control input of the user, and is not limited to the aforementioned examples. Also, for example, the control input is a gesture input, and may include various inputs such as contact or non-contact input. Also, the control input may be, but not limited to, an input through an input device or an input through voice or audio. Also, for example, the control input sensing unit 130 may be an element incorporated with the display unit 110. For example, the display unit 110 may be a touch sensitive display unit 120.

The sensor unit (not shown) may be a unit for sensing surrounding environment information. At this time, for example, the sensor unit may detect an input signal and deliver the detected input signal to the processor.

The processor 140 may be a unit for controlling the communication unit 110, the display unit 120 and the control input sensing unit 130. Also, the processor 140 may be a unit for further controlling the sensor unit. In more detail, the processor 140 may detect the control input of the user, which executes the first operation, by using the control input sensing unit 130. At this time, the processor 140 may further detect a control input for setting a configuration value of the first operation. For example, if the first operation is a cooling operation, the configuration value may be a temperature. That is, the processor 140 may detect the control input of the user, which executes cooling at a certain temperature. Also, for example, the configuration value may be a value that includes temperature and time conditions. That is, the configuration value is a value controlled by the user or the processor 140, and is not limited to the aforementioned examples.

If the processor 140 detects the control input for the first operation, the processor 140 may transmit the triggering signal to the external device by using the communication unit 110. At this time, if the processor 140 detects a control input for a first configuration value executable in the main device, the processor 140 may transmit a first triggering signal for executing the first operation to the main device. At this time, the main device may receive the first triggering signal and execute the first operation. Also, if the processor 140 detects a control input for a second configuration value executable in the main device only, the processor 140 may provide a notification for the cooperation device. At this time, for example, the notification may include at least one of a voice notification, a text notification, and an image notification. That is, the processor 140 may provide the user with information indicating that the first operation for the second configuration value cannot be executed by the main device.

For example, the processor 140 may set the first configuration value to "cooling at 18° within 20 minutes". At this time, the main device may be an air-conditioner. If the air-conditioner may execute cooling at 18° within 20 minutes, the processor 140 may transmit the first triggering signal to the air-conditioner. The air-conditioner may execute a cooling operation on the basis of the first triggering signal. Also, the processor 140 may set the second configuration value to "cooling at 18° within 10 minutes". At this time, the air-conditioner may not execute cooling at 18° within 10 minutes. At this time, the processor 140 may provide a notification for a humidifier that lowers humidity, as a sub-operation for the cooling operation. Also, the processor 140 may provide a notification for a window for preventing air flow through window opening or closing. That is, the if a configuration value which is not executable in the main device only is set, the processor 140 may provide a notification for the cooperation device.

Also, the aforementioned elements may be included in the digital device 100 as separate elements, or may be included in the digital device 100 by being incorporated as at least one or more elements.

Figure 2:
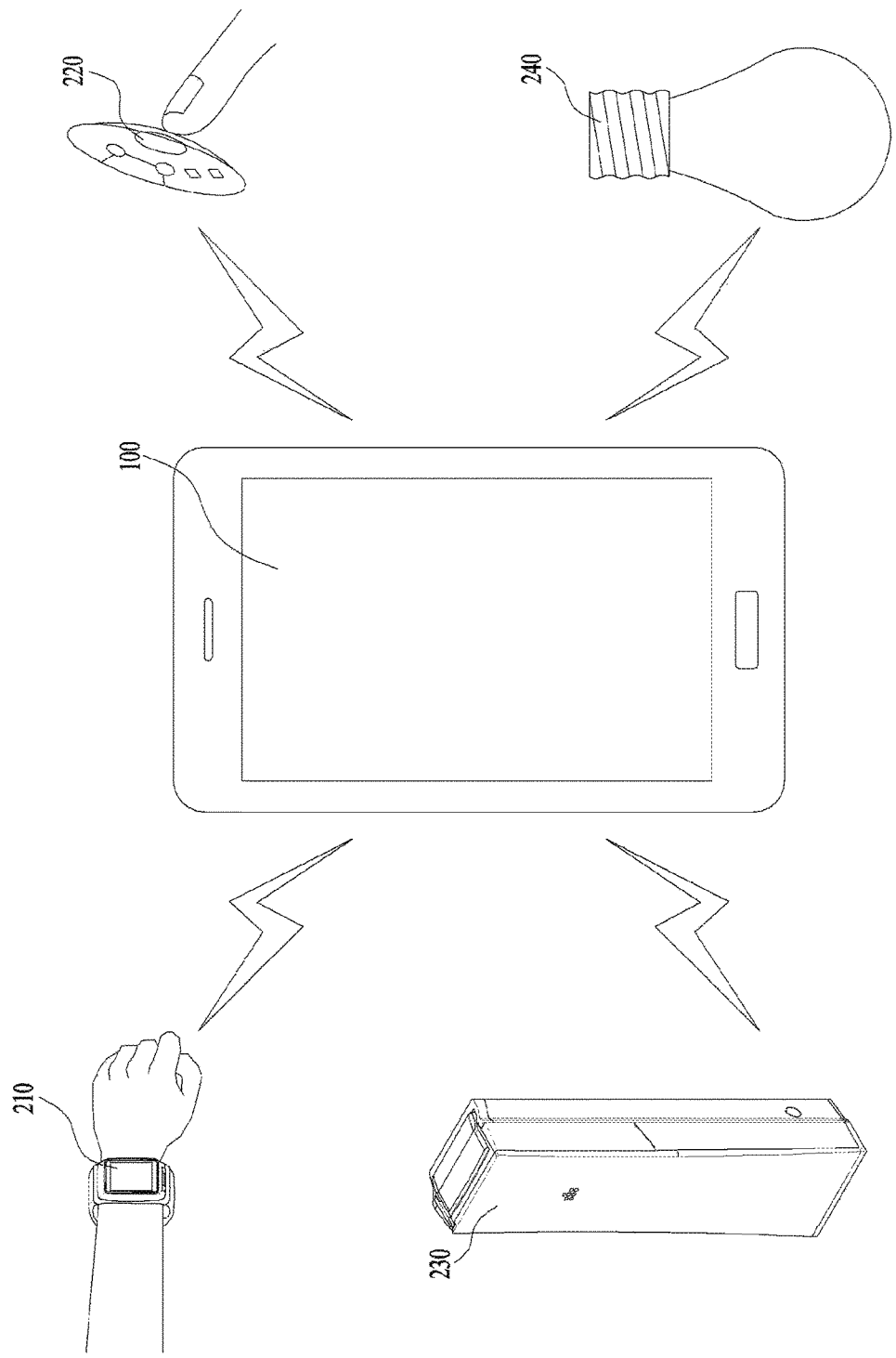
FIG. 2 is a view illustrating devices included in an IoT system in accordance with one embodiment of the present specification.

FIG. 2 is a view illustrating devices included in an IoT system in accordance with one embodiment of the present specification.

The IoT system may be a system that controls a surrounding device through communication. In more detail, the IoT system may include a digital device that controls execution of an operation by using a triggering signal. At this time, the digital device 100 may be a control device that controls devices included in the IoT system. For example, the digital device 100 may be a smart phone, a smart pad, a notebook computer, an HMD, a smart watch, or a remote controller. That is, the IoT system may use a device used by a user as a control device that may control surrounding devices. Also, the IoT system may include external devices 210, 220, 230 and 240, each of which receives a triggering signal from the digital device 100 and executes an operation. For example, a main device for executing a first operation may be included in the external devices 210, 220, 230 and 240. Also, a cooperation device for executing a second operation related to the first operation may be included in the external devices 210, 220, 230 and 240. At this time, the second operation may be a sub-operation of the first operation. The main device and the cooperation device may be changed depending on types of the operation. If the operation is determined, the main device may be configured as a device most related to a function of the operation. That is, in the IoT system, the control device may include the digital device 100 and the external devices 210, 220, 230 and 240, each of which executes an operation. A user may control a surrounding environment using the IoT system. At this time, for example, the external devices may include a sensor unit. At this time, the sensor unit may sense surrounding environment information as described with reference to FIG. 1. Also, in the IoT system, the digital device 100 may detect a control input. At this time, if the digital device 100 detects a first control input for a first configuration value executable using the main device, the digital device 100 may transmit a first triggering signal to the main device. At this time, the main device may execute the first operation on the basis of the first triggering signal. Also, if the digital device 100 detects a second control input for a second configuration value which is not executable using the main device, the digital device 100 may provide a notification for a cooperation device. In more detail, the digital device 100 may provide information indicating that the first operation cannot be executed by the main device only. Also, the digital device may provide a notification for cooperation devices that may execute the second operation which is a sub-operation of the first operation. That is, in the IoT system, the digital device 100 may transmit a triggering signal to the external devices 210, 220, 230 and 240 by controlling execution of the operation. Hereinafter, the disclosure described with reference to the drawings is the embodiment which is executable in the digital device or the IoT system, and is not limited to the aforementioned embodiment.

Figure 3B:
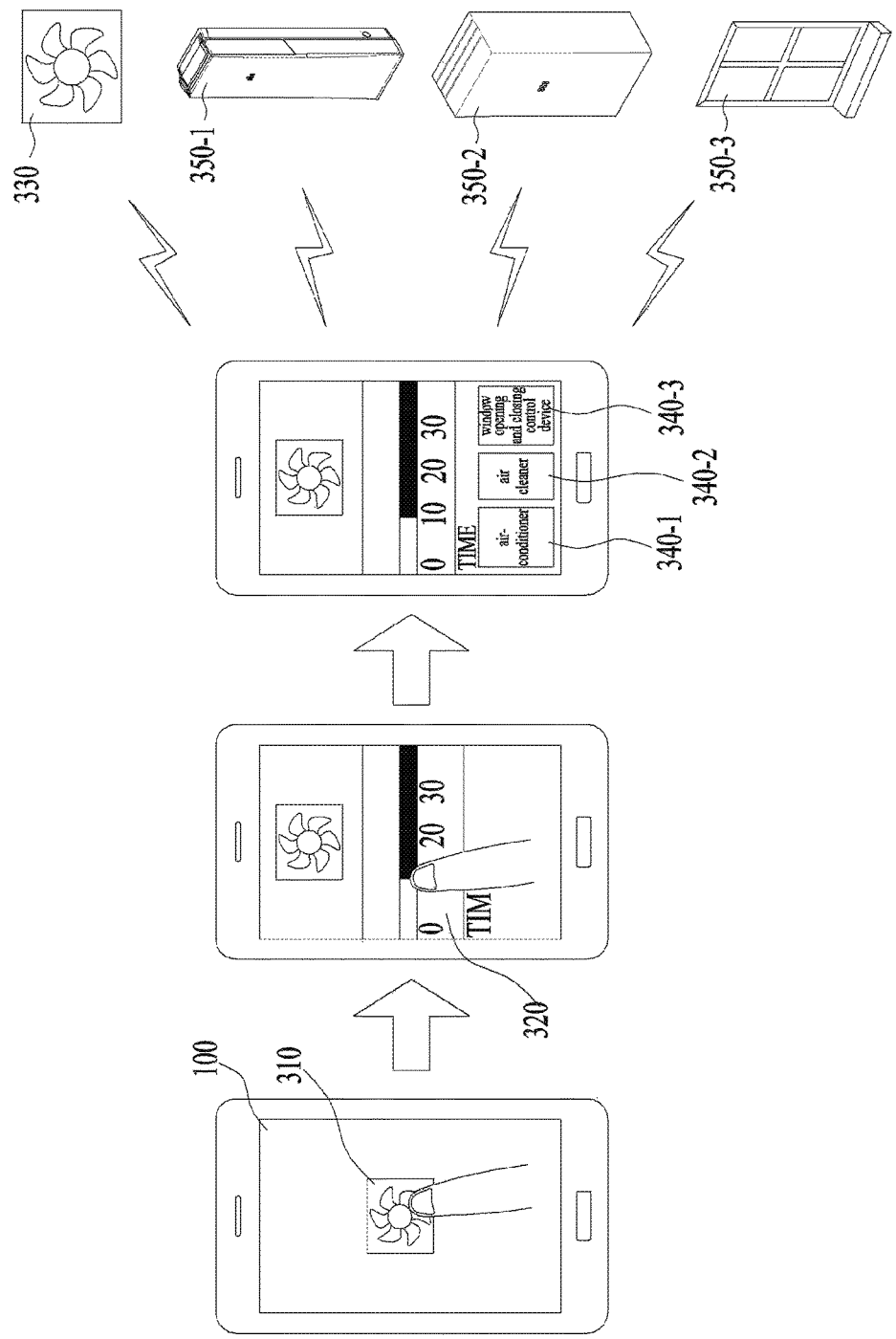

FIGS. 3a and 3b are views illustrating a method for controlling a first operation on the basis of a configuration value in a digital device in accordance with one embodiment of the present specification. The digital device 100 may detect the control input for executing the first operation by using the control input sensing unit 130. At this time, the digital device 100 may further detect the control input for controlling the configuration value of the first operation. In more detail, if the digital device 100 detects the control input for the first operation, the digital device 100 may display a second interface 320 for the configuration value of the first operation. At this time, the digital device 100 may detect the control input for the configuration value of the first operation from the second interface. At this time, the digital device 100 may transmit the triggering signal to the external device on the basis of the configuration value of the first operation. For example, if the digital device 100 detects a control input for a first configuration value executable using the main device, the digital device 100 may transmit a first triggering signal for executing the first operation to the main device which is the external device. At this time, the main device may execute the first operation on the basis of the first triggering signal.

For example, if the digital device 100 detects the control input for the first configuration value, the digital device 100 may transmit first information as to possible execution to the main device. At this time, if the main device may execute the first operation for the first configuration value, the main device may transmit second information which is information as to possible execution. At this time, if the digital device 100 receives the second information, the digital device 100 may transmit the first triggering signal for executing the first operation to the main device. At this time, the main device may execute the first operation on the basis of the first triggering signal which is received.

For another example, the digital device 100 may determine the first configuration value on the basis of a predetermined limit value of the main device. That is, the digital device 100 may determine whether the first configuration value is executable in the main device only in a state that information is not exchanged with the main device, and this determination is not limited to the aforementioned example.

Also, if the digital device 100 detects a control input for a second configuration value which is not executable using the main device, the digital device 100 may detect a cooperation device related to the first operation and provide a notification for the detected cooperation device.

At this time, for example, the digital device 100 may transmit operation execution information to the main device. The main device may transmit information on the cooperation device to the digital device 100 on the basis of the received operation information. The digital device 100 may detect the cooperation device on the basis of the received information on the cooperation device. That is, the digital device 100 may detect the cooperation device through communication with the main device.

For another example, the digital device 100 may detect the cooperation device among predetermined devices. The digital device 100 may detect the cooperation device through predetermined information without performing communication with the main device. The digital device 100 may detect the cooperation device on the basis of the first operation. This detection is not limited to the aforementioned example.

Also, for example, the digital device 100 may set a priority for the cooperation device. At this time, the digital device 100 may set a priority for the cooperation devices on the basis of operation attributes and configuration value of the first operation. In more detail, the digital device 100 may set a priority based on a device that may most easily satisfy the configuration value considering operation attributes. At this time, for example, the digital device 100 may acquire priority information through predetermined information or communication with the external devices. If the digital device 100 acquires priority information on the cooperation devices, the digital device 100 may provide a notification on the basis of the priority information. For example, the digital device 100 may provide a notification in due order on the basis of the priority. This case is not limited to the aforementioned example.

Also, if the digital device 100 detects the cooperation device, the digital device 100 may transmit the first triggering signal for executing the first operation to the main device. Also, the digital device 100 may transmit the second triggering signal related to the first operation to the cooperation device.

At this time, for example, the main device may execute the first operation on the basis of the first triggering signal. Also, the cooperation device may execute the first operation simultaneously with the main device on the basis of the second triggering signal which is received. That is, the main device and the cooperation device may simultaneously execute the first operation for the second configuration value. As a result, the digital device 100 may control the first operation for the second configuration value.

For another example, the main device may execute the first operation on the basis of the first triggering signal. At this time, the cooperation device may execute the second operation on the basis of the second configuration value. In this case, the second operation may be a sub-operation of the first operation based on the second configuration value. That is, the cooperation device may execute the operation for assisting the operation executed by the main device. As a result, the digital device 100 may control the first operation for the second configuration value.

If the first operation for the second configuration value is executed by the main device and the cooperation device, the digital device 100 may receive surrounding environment sensing information for the second configuration value from at least one of the main device and the cooperation device. At this time, the digital device 100 may receive surrounding environment sensing information through the communication unit 110. Also, the main device and the cooperation device may sense surrounding environment information using the sensing unit. The main device and the cooperation device may include the communication unit, and may transmit surrounding environment sensing information on the second configuration information to the digital device by using the communication unit. At this time, the digital device may detect whether the second configuration value has been satisfied, using the received surrounding environment sensing information. That is, the digital device 100 may acquire information as to whether the cooperation device should be used continuously using the surrounding environment sensing information. At this time, if the digital device 100 detects that the second configuration value is satisfied, on the basis of the surrounding environment sensing information, the digital device 100 may transmit a third triggering signal to the cooperation device. At this time, the cooperation device 100 may end the second operation on the basis of the third triggering signal. That is, the digital device 100 may receive the surrounding environment sensing information from the external devices and control the device, which is operated, on the basis of the received information. This case is not limited to the aforementioned example.

In more detailed embodiment, referring to FIG. 3a, the digital device 100 may detect a control input for a ventilating operation, which controls ventilation of the air. At this time, for example, the digital device 100 may display a first object 310 for the ventilating operation. If the digital device 100 detects a control input for selecting the first object 310 for the ventilating operation, the digital device 100 may display a second interface 320 for a configuration value of the ventilating operation. At this time, the second interface 320 may be an interface related to the time when ventilation is completed. At this time, the digital device 100 may detect a control input for selecting the time when ventilation is completed. In this case, the digital device 100 may transmit the first information, which is information as to possible execution, to a ventilator 330 which is the external device. If the ventilator 330 may complete ventilation within 20 minutes by executing the ventilating operation, the ventilator 330 may transmit second information to the digital device 100. The digital device 100 may transmit a first triggering signal for executing the ventilating operation on the basis of the second information to the ventilator 330. The ventilator 330 may execute the ventilating operation on the basis of the first triggering signal. That is, the digital device 100 may transmit the first triggering signal to the ventilator 330 only if the ventilating operation may be executed by the ventilator 330 only which is the main device.

For another example, the digital device 100 may determine whether the ventilator 330 may execute "complete ventilation within 20 minutes" on the basis of predetermined information on the ventilator 330. If the ventilating operation is executable in the ventilator 330 only, the digital device 100 may transmit the first triggering signal to the ventilator 330 only.

Also, referring to FIG. 3b, the digital device 100 may detect a control input for completing ventilation within 10 minutes. At this time, the digital device 100 may transmit first information which is information on possible execution, to the ventilator 330. If the ventilator 330 cannot complete ventilation within 10 minutes, the ventilator 330 may transmit third information, which is information on impossible execution, to the digital device 100. At this time, the digital device 100 may detect cooperation devices 350-1, 350-2 and 350-3 for the ventilating operation. For example, the digital device may detect the cooperation devices 350-1, 350-2 and 350-3 on the basis of predetermined information. Also, for example, the digital device 100 may acquire information of the cooperation devices 350-1, 350-2 and 350-3 through communication. This case is not limited to the aforementioned example. If the digital device 100 detects the cooperation devices 350-1, 350-2 and 350-3, the digital device may provide a notification for the cooperation devices 350-1, 350-2 and 350-3. For example, the notification may be visual information. That is, the digital device 100 may display visual information 340-1, 340-2 and 340-3 for the cooperation devices 350-1, 350-2 and 350-3.

Figure 4A:
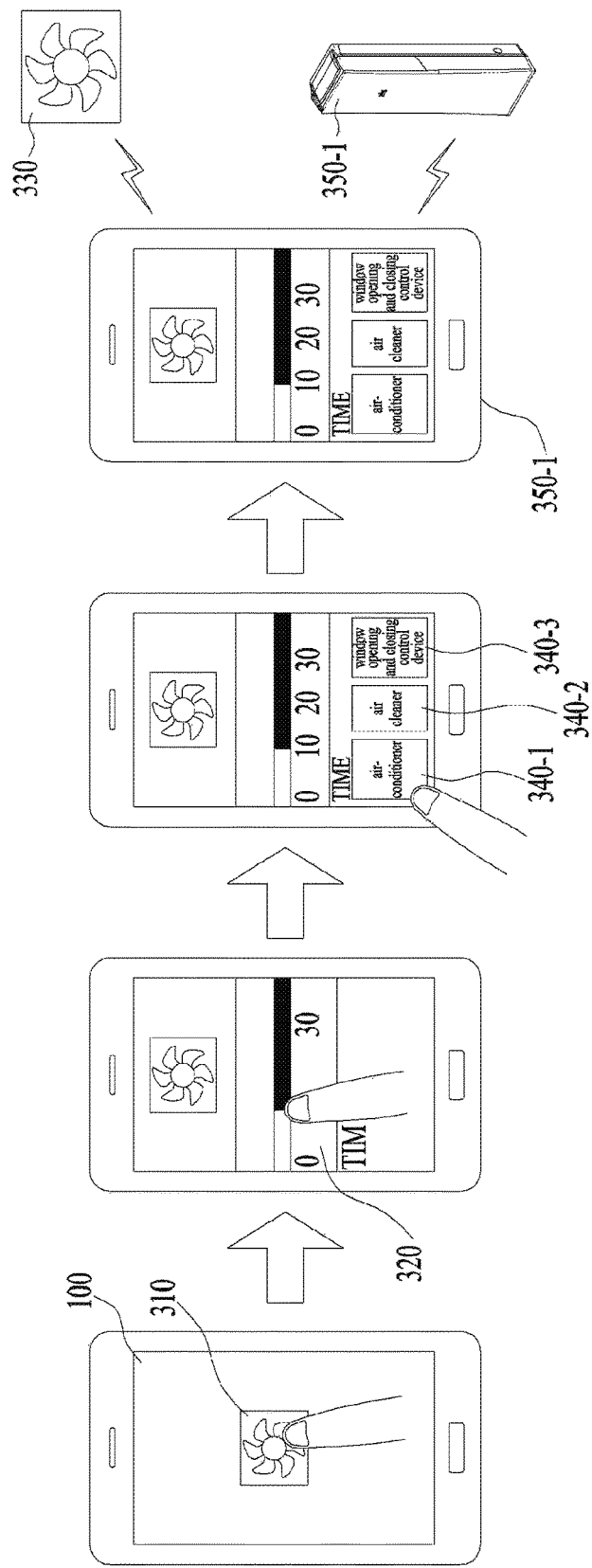
FIGS. 4a and 4b are views illustrating a method for controlling a cooperation device in a digital device in accordance with one embodiment of the present specification.
Figure 4B:
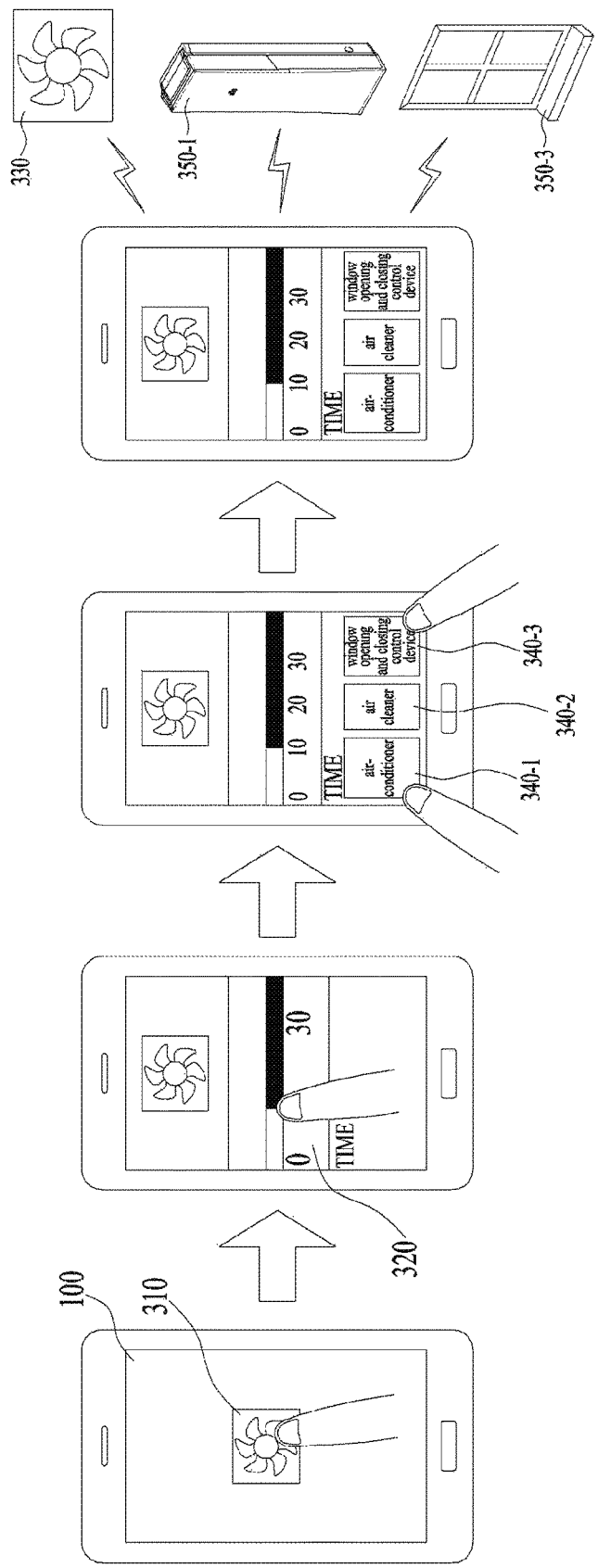

FIGS. 4a and 4b are views illustrating a method for controlling a cooperation device in a digital device in accordance with one embodiment of the present specification. If the digital device 100 detects the cooperation devices 350-1, 350-2 and 350-3, the digital device 100 may provide notifications 340-1, 340-2 and 340-3 for the cooperation devices 350-1, 350-2 and 350-3.

At this time, for example, the digital device 100 may detect the cooperation devices on the basis of operation attributes of the first operation. That is, if the first operation is a ventilating operation, the cooperation devices 350-1, 350-2 and 350-3 may be an air-conditioner, an air cleaner, a window, etc. related to the ventilator 330. That is, the cooperation devices 350-1, 350-2 and 350-3 may be devices related to the ventilating operation. Also, for example, if the operation is changed, the cooperation devices 350-1, 350-2 and 350-3 may be changed on the basis of, but not limited to, the operation attributes.

Also, for example, the digital device 100 may transmit a second triggering signal to all of the detected cooperation devices 350-1, 350-2 and 350-3. The cooperation devices 350-1, 350-2 and 350-3 may execute the first operation or the second operation, which is a sub-operation of the first operation, on the basis of the second triggering signal which is received.

Also, for example, referring to FIG. 4a, the digital device 100 may display visual information 340-1, 340-2 and 340-3 for all of the cooperation devices 350-1, 350-2 and 350-3. At this time, the digital device 100 may select the cooperation device on the basis of a control input for the displayed visual information. In more detail, the digital device 100 may detect a first control input for selecting the first visual information 340-1 for the first cooperation device 350-1. At this time, the digital device 100 may transmit the first triggering signal to the main device 330. Simultaneously, the digital device 100 may transmit the second triggering signal to the first cooperation device 350-1. At this time, the main device 330 may execute the first operation. Simultaneously, the first cooperation device 350-1 may execute the first operation or the second operation which is a sub-operation of the first operation. At this time, if the first operation that satisfies the configuration value may be executed using the main device 330 and the first cooperation device 350-1, the digital device 100 may end the second interface 320 for the operation. Also, for example, the digital device 100 may display information indicating the operation is executed after the interface ends. This case is not limited to the aforementioned example.

Also, for example, referring to FIG. 4b, the digital device 100 may detect the first control input for selecting the first visual information 340-1 for the first cooperation device 350-1. Also, the digital device 100 may detect a second control input for selecting the third visual information 340-3 for the third cooperation device 350-3. At this time, the digital device 100 may transmit the first triggering signal to the main device 330. Simultaneously, the digital device 100 may transmit the second triggering signal to the first cooperation device 350-1 and the third cooperation device 350-3. At this time, the main device 330 may execute the first operation. The first cooperation device 350-1 and the third cooperation device 350-3 may execute the first operation or the second operation which is a sub-operation of the first operation.

Figure 5:
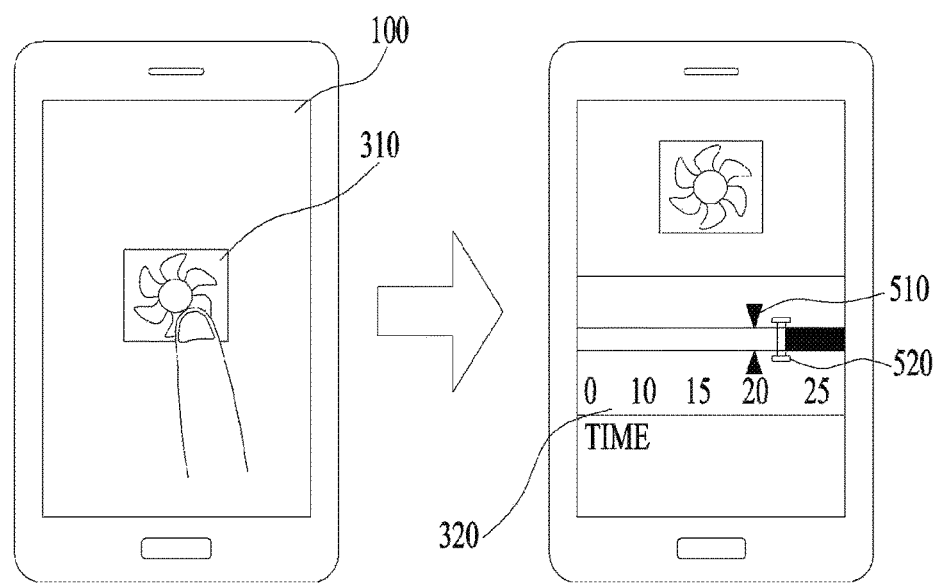
FIG. 5 is a view illustrating a method for configuring a configuration value for a first operation in a digital device in accordance with one embodiment of the present specification.

FIG. 5 is a view illustrating a method for configuring a configuration value for a first operation in a digital device in accordance with one embodiment of the present specification.

The digital device 100 may display the first object 310 for the first operation. At this time, the digital device 100 may detect a control input for the first object 310. That is, the digital device 100 may detect a control input for executing the first operation. At this time, the digital device 100 may further display a second interface 320 for controlling the configuration value of the first operation. At this time, for example, the second interface 320 may include the configuration value of the first operation and information as to possible execution. In more detail, the digital device 100 may further display a first indicator 510 on the second interface 320. At this time, the first indicator 510 may indicate a configuration value executable in the main device 330 only. That is, a limit value executable in the main device 330 only may be displayed on the second interface 320. Also, the second interface 320 may further display a second indicator 520. At this time, the second indicator 520 may be a configuration value at the current state. The second indicator 520 may be controlled by a user. That is, the user may adjust the configuration value of the first operation by adjusting the second indicator 520. At this time, the digital device 100 may detect the configuration value of the first operation on the basis of the second indicator 520.

Figure 6:
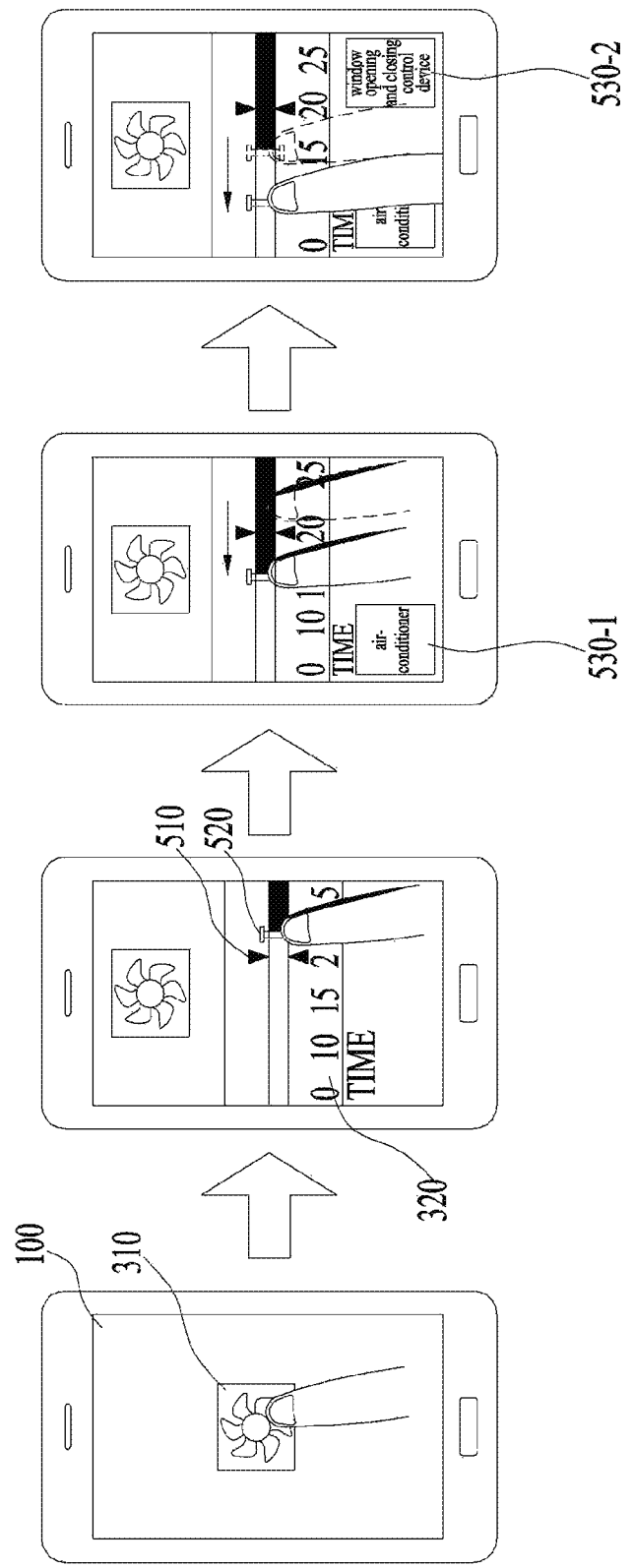
FIG. 6 is a view illustrating a method for providing a notification related to a cooperation device on the basis of a configuration value in a digital device in accordance with one embodiment of the present specification.

FIG. 6 is a view illustrating a method for providing a notification related to a cooperation device on the basis of a configuration value in a digital device in accordance with one embodiment of the present specification.

If the digital device 100 detects a control input for selecting the first object 310 for the first operation, the digital device 100 may display the second interface 320. At this time, the second interface 320 may be an interface for the configuration value of the first operation. The second interface 320 may include the first indicator 510 indicating a limit value of the main device. Also, the second interface 320 may include a second indicator 520 indicating a current configuration value. At this time, for example, the digital device 100 may detect that the second indicator 520 moves. For example, the second indicator 520 may be arranged behind the first indicator 510. That is, the current configuration value of the first operation may be set to a value smaller than the limit value of the main device. For example, the digital device 100 may not provide a notification for the cooperation devices. That is, the digital device 100 may not display visual information on the cooperation devices. At this time, the digital device 100 may detect that the second indicator 520 moves to the front of the first indicator 510. In this case, the digital device 100 may provide a notification for the cooperation devices.

At this time, for example, the digital device 100 may provide a notification for the cooperation devices on the basis of a priority. In more detail, the digital device 100 may configure a priority of the cooperation devices on the basis of attributes of the first operation. At this time, the digital device 100 may provide a notification for the cooperation devices on the basis of the priority. For example, the digital device 100 may first display the cooperation device having a high priority. For another example, the digital device 100 may provide a notification for the cooperation device having a high priority and then provide a notification for the cooperation device having a lower priority. That is, the digital device 100 may provide a notification by configuring a priority, and the present specification is not limited to the aforementioned example. Also, the priority may be configured based on attributes and configuration value of the first operation. That is, the digital device 100 may first provide a notification for the cooperation device, which may first reach the configuration value, by considering the attributes of the first operation.

Also, the notification for the priority may be provided by the second interface 320. In more detail, if the second indicator 520 moves to the same position as that of the first indicator 510, the digital device 100 may provide a notification for a limit value of the main device. At this time, the notification may be a voice, image, etc. Afterwards, if the second indicator 520 moves to a first position ahead of the first indicator 510, the digital device 100 may provide a notification for the main device and the first cooperation device 530-1. That is, the digital device 100 may provide visual information on the first cooperation device 530-1. At this time, for example, the first cooperation device 530-1 may be a device having a high priority among the cooperation devices. Afterwards, the second indicator 520 may move a second position. At this time, the second position may be arranged ahead of the first position. That is, the second indicator 520 may be set to a value greater than the limit value of the main device. At this time, the digital device 100 may provide a notification for the first cooperation device 530-1 and the second cooperation device 530-2. In this case, the second cooperation device 530-2 may be a device having a priority lower than that of the first cooperation device 530-1. That is, the digital device 100 may control the notification of the cooperation devices in accordance with the configuration value, and the present specification is not limited to the aforementioned example.

Figure 7:
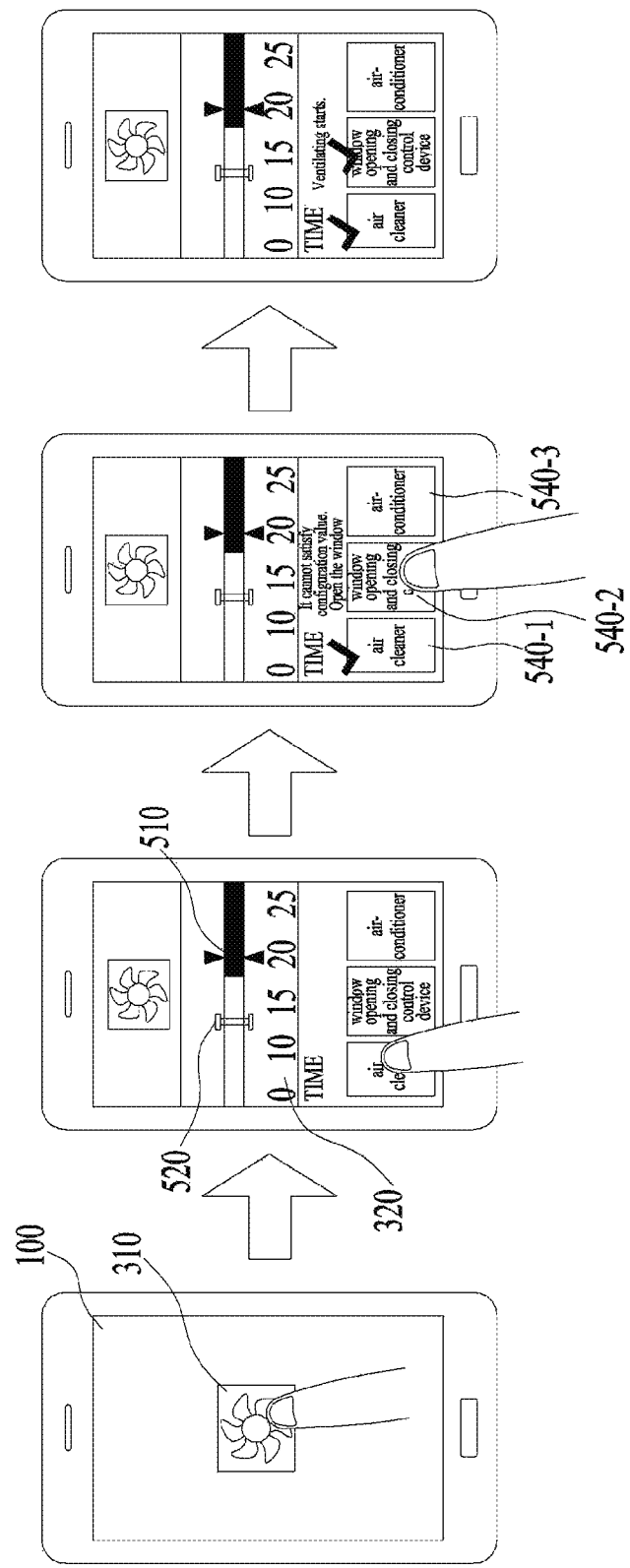
FIG. 7 is a view illustrating a method for providing a notification related to a cooperation device on the basis of a configuration value in a digital device in accordance with one embodiment of the present specification.

FIG. 7 is a view illustrating a method for providing a notification related to a cooperation device on the basis of a configuration value in a digital device in accordance with one embodiment of the present specification. If the digital device 100 detects a control input for selecting the first object 310 for the first operation, the digital device 100 may display the second interface 320. At this time, for example, the digital device 100 may further display visual information of the cooperation devices 540-1, 540-2 and 540-3. That is, the digital device 100 may simultaneously display visual information of the cooperation devices 540-1, 540-2 and 540-3 and the second interface 320.

For example, the digital device 100 may detect a control input for controlling the second indicator 520 from the second interface 320. At this time, the digital device 100 may detect a control input for setting the configuration value of the first operation to a second configuration value on the basis of the second indicator 520. At this time, the second configuration value may be a value greater than the limit value of the main device, which is indicated by the first indicator 510. That is, the second configuration value may be a value which is not executable in the main device only. At this time, the digital device 100 may detect a control input for selecting the first cooperation device 540-1. If the first operation for the second configuration value may be executed using the main device and the first cooperation device 540-1, the digital device 100 may transmit a triggering signal. At this time, the digital device 100 may transmit a first triggering signal for executing the first operation to the main device. Also, the digital device 100 may transmit a second triggering signal to the first cooperation device 540-1. At this time, the main device and the first cooperation device 540-1 may execute the first operation. For example, the digital device 100 may further display execution information of the first operation. As a result, the user may identify information indicating that the main device and the first cooperation device 540-1 are executed, through the digital device 100.

Also, for example, if the second configuration value is not executable using the main device and the first cooperation device 540-1, the digital device 100 may display impossible information of the first operation. At this time, for example, the digital device 100 may display recommendation information of the cooperation device. In more detail, the digital device 100 may display recommendation information of the cooperation device, which may satisfy the second configuration value, by considering operation attributes of the first operation and features of the cooperation devices. The digital device 100 may detect a control input for further selecting the second cooperation device 540-2 on the basis of the impossible information of the first operation. At this time, if the first operation for the second configuration value is executable using the main deceive, the first cooperation device 540-1 and the second cooperation device 540-2, the digital device 100 may transmit the triggering signal. At this time, the digital device 100 may transmit the first triggering signal of the first operation to the main device. Also, the digital device 100 may transmit the second triggering signal to the first and second cooperation devices 540-1 and 540-2. At this time, the main device and the first and second cooperation devices 540-1 and 540-2 may execute the first operation. At this time, the digital device 100 may display the execution information of the first operation as described above.

Figure 8:
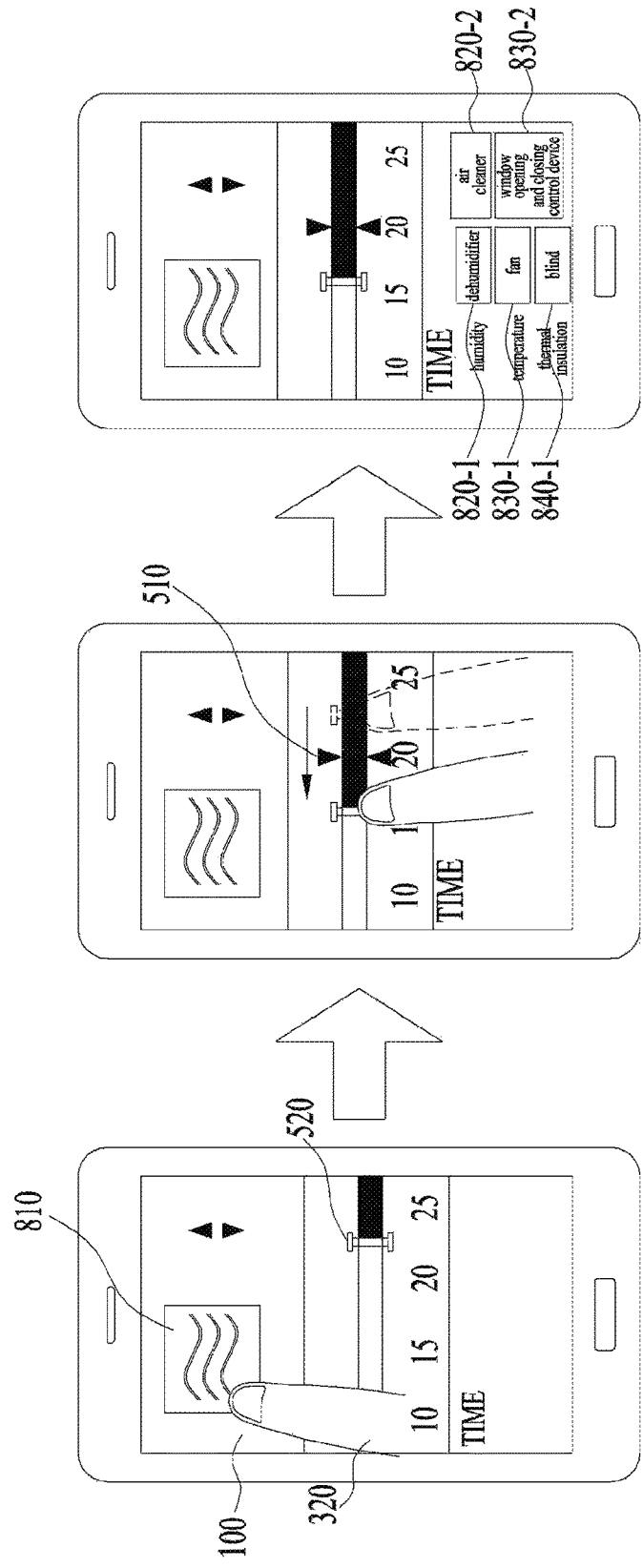
FIG. 8 is a view illustrating a method for providing a notification related to a cooperation device on the basis of operation attributes in a digital device in accordance with one embodiment of the present specification.

FIG. 8 is a view illustrating a method for providing a notification related to a cooperation device on the basis of operation attributes in a digital device in accordance with one embodiment of the present specification.

If the digital device 100 detects a control input for selecting the first object 310 for the first operation, the digital device 100 may display the second interface 320. At this time, for example, the digital device 100 may further display visual information of the cooperation devices. That is, the digital device 100 may simultaneously display visual information of the cooperation devices and the second interface 320. At this time, for example, the digital device 100 may display the cooperation devices by classifying them on the basis of the first operation and the configuration value. In more detail, the digital device 100 may display the cooperation devices 820-1 and 820-2 for the first attribute related to the first operation by classifying them. At this time, the first attribute may be an attribute related to the first operation. That is, the first attribute may be an attribute that affects the first operation. Likewise, the digital device 100 may display the cooperation devices 830-1 and 830-2 for the second attribute by classifying them. In the same manner, the digital device 100 may display the cooperation devices by classifying them per attribute related to the first operation. This classification is not limited to the aforementioned example.

For example, referring to FIG. 8, the first operation may be a cooling operation. At this time, the second interface 320 may provide a configuration value for a cooling temperature and a time to reach a temperature. For example, the digital device 100 may detect a second configuration value for setting a cooling temperature to 18° and setting a time to reach a temperature to 15 minutes. At this time, the second configuration value may be a configuration value which is not executable using only an air-conditioner which is the main device. At this time, the digital device 100 may display visual information of the cooperation devices related to cooling. Examples of attributes related to the cooling operation may include humidity, temperature, thermal insulation, etc. In more detail, the cooling operation may be configured to another condition by current humidity, current temperature, thermal insulation, etc. For example, if the current temperature is low and external thermal insulation is efficiently performed, the time to reach a temperature related to the cooling operation may be set to be shorter. That is, the digital device 100 may display the cooperation devices by classifying them considering the attributes of the first operation, and this classification is not limited to the aforementioned example. At this time, the digital device 100 may display the cooperation devices 820-1 and 820-2 that may adjust humidity with respect to the cooling operation by classifying them. Also, the digital device 100 may display the cooperation devices 830-1 and 830-2 that may adjust temperature with respect to the cooling operation by classifying them. Also, the digital device 100 may display the cooperation devices 840-1 that may adjust thermal insulation with respect to the cooling operation by classifying them. As a result, the user may acquire information on the cooperation devices with respect to the second configuration value and the first operation.

Figure 9:
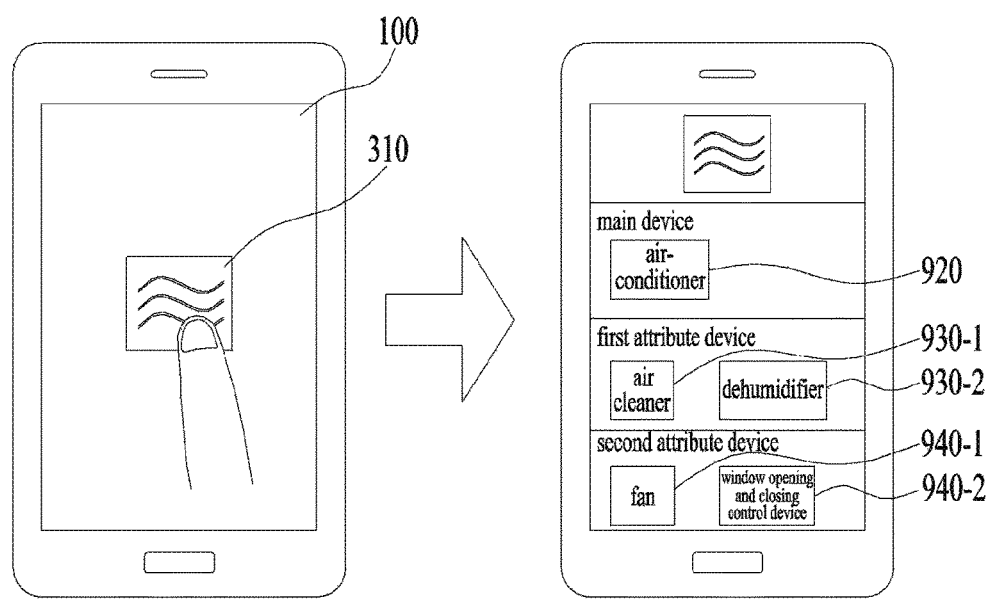
FIG. 9 is a view illustrating a method for providing a notification related to a cooperation device on the basis of operation attributes in a digital device in accordance with one embodiment of the present specification.

FIG. 9 is a view illustrating a method for providing a notification related to a cooperation device on the basis of operation attributes in a digital device in accordance with one embodiment of the present specification. The digital device 100 may detect a control input for selecting the first object 310 for the first operation. At this time, the digital device 100 may display an interface for the first operation. The interface may include information on the main device and the cooperation device. That is, the digital device 100 may provide information on the main device and the cooperation device on the basis of the control input for the first operation. At this time, for example, the cooperation devices may be displayed on the basis of the attributes of the first operation as described above. As a result, the user may acquire the information on the main device and the cooperation device.

In more detail, for example, the digital device 100 may detect a control input for selecting the first object 310 for the cooling operation. At this time, the digital device 100 may display visual information of an air-conditioner 920 which is the main device. Also, the digital device 100 may display visual information of the devices 930-1 and 930-2 having the first attribute related to the cooling operation. At this time, for example, the first attribute may be a feature related to humidity, and an air cleaner 930-1 and a dehumidifier 930-2 may be provided as the cooperation devices. Also, the digital device 100 may display visual information of the devices 940-1 and 940-2 having the second attribute related to the cooling operation. At this time, the second attribute may be a feature related to temperature, and a fan 940-1 and a window opening and closing control device 940-2 may be provided as the cooperation devices.

In addition, the digital device 100 may provide information on the main device and the cooperation devices on the basis of the attribute of the first operation, and this is not limited to the aforementioned example.

Figure 10:
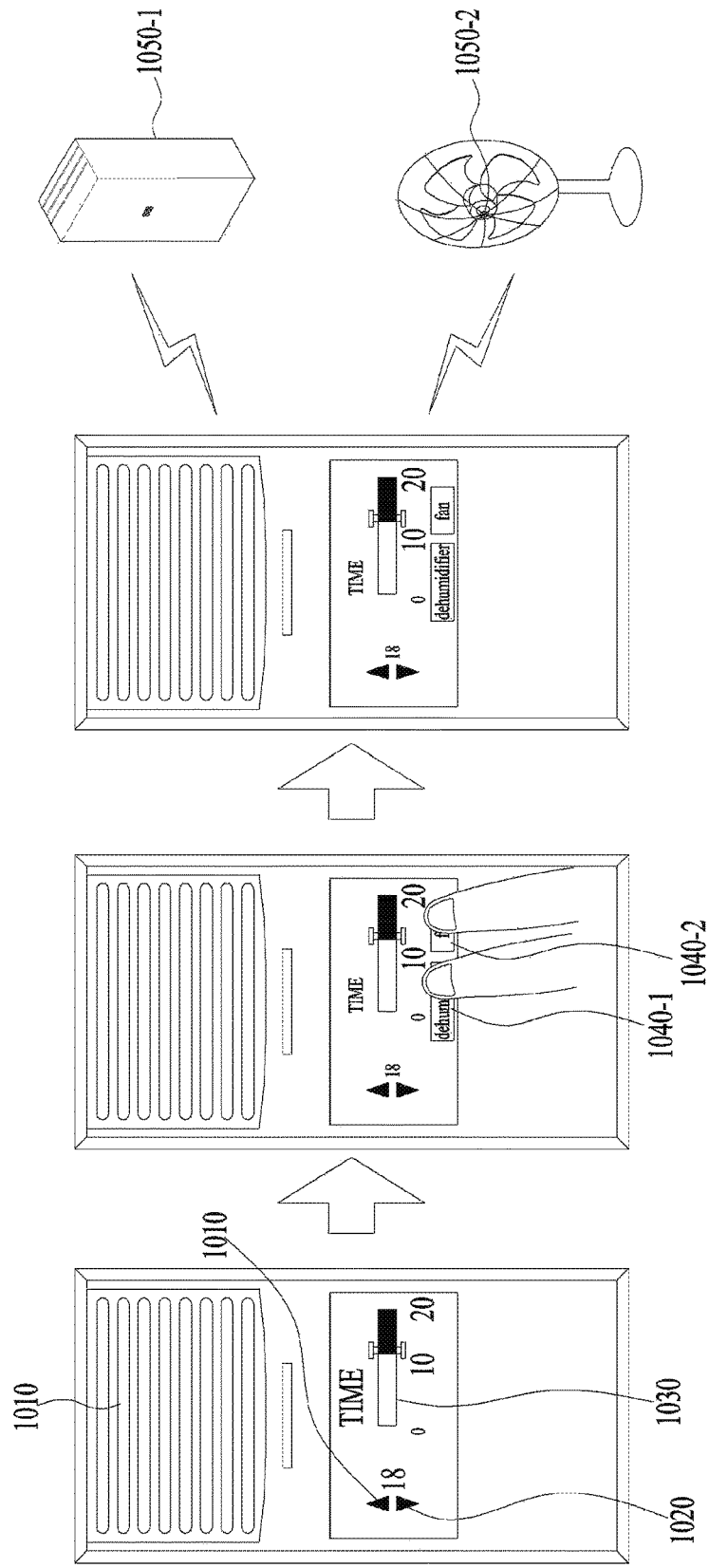
FIG. 10 is a view illustrating a method for controlling an operation by using a main device in accordance with one embodiment of the present specification.

FIG. 10 is a view illustrating a method for controlling an operation by using a main device in accordance with one embodiment of the present specification.

The IoT system may detect a control input for the first operation using the digital device 100. At this time, the digital device 100 may control whether to execute the first operation by transmitting a triggering signal to the main device and the cooperation device.

At this time, for example, in the IoT system, the main device 1010 may control whether to execute the first operation. The main device 1010 may transmit a first triggering signal for the first operation to the cooperation devices 1050-1 and 1050-2. At this time, the cooperation devices 1050-1 and 1050-2 may execute the first operation or the second operation which is a sub-operation of the first operation on the basis of the first triggering signal.

In more detail, in the IoT system, the main device 1010 which executes the first operation may be a control device. At this time, the main device 1010 may detect a control input for executing the first operation. The main device 1010 may display a first interface for the first operation. At this time, the main device 1010 may detect a control input for detecting the first interface. For example, the main device 1010 may detect a control input for a first configuration value on the basis of the first interface. At this time, the first configuration value may be a configuration value which is executable using the main device only. The main device 1010 may directly execute the first operation for the first configuration value. Also, the main device 1010 may detect a control input for a second configuration value. At this time, the second configuration value may be a configuration value which is not executable using the main device only. In this case, the main device 1010 may detect a notification for the cooperation devices 1050-1 and 1050-2. Also, the main device 1010 may transmit the first triggering signal to the cooperation devices cooperation devices 1050-1 and 1050-2. At this time, the cooperation devices 1050-1 and 1050-2 may execute the first operation simultaneously with the main device 1010. Also, for example, the cooperation devices 1050-1 and 1050-2 may execute the second operation which is a sub-operation related to the first operation.

That is, in the IoT system, the digital device may be used as a control device for controlling the external devices. Also, the IoT system may control surrounding devices by using the main device 1010, which executes the operation, instead of a separate control device. In the aforementioned drawings, the functions executed in the digital device may be executed in the main device 1010, and are not limited to the aforementioned example.

FIG. 11 is a view illustrating a method for controlling a digital device in accordance with one embodiment of the present specification. The digital device 100 may detect a control input for executing the first operation (S1110). At this time, as described with reference to FIG. 1, the first operation may be an operation executed by at least one of the external devices. At this time, the first operation may be an operation selected by the digital device 100. That is, if the digital device 100 selects the first operation, one of the external devices, which may execute the first operation, may be configured as the main device. Also, the external device, which may execute the sub-operation related to the first operation, may be selected as the cooperation device. That is, the first operation may be selected based on the control input selected by the digital device 100, and the main device and the cooperation device may be determined based on the first operation.

Next, if the digital device 100 detects a first control input for a first configuration value, the digital device 100 may transmit a first triggering signal for executing the first operation to the main device on the basis of the first control input (S1120). At this time, as described with reference to FIG. 3a, the first configuration value may be a configuration value which is executable using the main device only. At this time, if the digital device 100 detects the first control input, the digital device 100 may transmit first information on possible execution to the main device. At this time, if the main device may execute the first operation for the first configuration value, the main device may transmit second information which is executable. If the digital device 100 receives the second information, the digital device 100 may transmit the first triggering signal for executing the first operation to the main device. At this time, the main device may execute the first operation on the basis of the first triggering signal which is received.

Next, if the digital device 100 detects a second control input for a second configuration value, the digital device 100 may detect a cooperation device related to the first operation (S1130). As described with reference to FIG. 4a, the digital device 100 may detect the cooperation device related to the first operation. At this time, for example, the digital device 100 may detect the cooperation device on the basis of operation attributes of the first operation. Also, for example, if the operation is changed, the cooperation devices 350-1, 350-2 and 350-3 may be changed based on, but not limited to, the operation attributes.

Next, the digital device 100 may provide a notification for the cooperation device (S1140). At this time, as described with reference to FIG. 1, the notification may include at least one of a voice notification, a text notification and an image notification. That is, the processor 140 may provide the user with information indicating that the first operation for the second configuration value cannot be executed by the main device. Also, the digital device 100 may determine the configuration value for the first operation through the interface, and may provide visual information for the related cooperation devices. Also, if the digital device 100 provides a notification for the cooperation devices, the digital device 100 may transmit the first triggering signal for executing the first operation to the main device. Also, the digital device 100 may transmit the second triggering signal related to the first operation to the cooperation device. At this time, for example, the main device and the cooperation device may simultaneously execute the first operation.

Also, for example, the main device may execute the first operation on the basis of the first triggering signal. At this time, the cooperation device may execute the second operation which is a sub-operation of the first operation, on the basis of the second triggering signal.

Moreover, for convenience of description, although the description has been made for each of the drawings, the embodiments of the respective drawings may be incorporated to achieve a new embodiment. A computer readable recording medium where a program for implementing the aforementioned embodiments is recorded may be designed in accordance with the need of the person skilled in the art within the scope of the present invention.

The digital device 100 and the method for controlling the same according to the present invention are not limited to the aforementioned embodiments, and all or some of the aforementioned embodiments may selectively be configured in combination so that various modifications may be made in the aforementioned embodiments.

Meanwhile, the digital device 100 and the method for controlling the same according to the present specification may be implemented in a recording medium, which may be read by a processor provided in a network device, as a code that can be read by the processor. The recording medium that can be read by the processor includes all kinds of recording media in which data that can be read by the processor are stored. Examples of the recording medium include a ROM, a RAM, a CD-ROM, a magnetic tape, a floppy disk, and an optical data memory. Also, another example of the recording medium may be implemented in a shape of carrier wave such as transmission through Internet. Also, the recording medium that can be read by the processor may be distributed in a computer system connected thereto through the network, whereby codes that can be read by the processor may be stored and implemented in a distributive mode.

It will be apparent to those skilled in the art that the present specification can be embodied in other specific forms without departing from the spirit and essential characteristics of the specification. Thus, the above embodiments are to be considered in all respects as illustrative and not restrictive. The scope of the specification should be determined by reasonable interpretation of the appended claims and all change which comes within the equivalent scope of the specification are included in the scope of the specification.

In this specification, both the product invention and the method invention have been described, and description of both inventions may be made complementally if necessary.

MODE FOR IMPLEMENTING THE INVENTION

-

INDUSTRIAL APPLICABILITY

The present invention has industrial applicability, which can be used for a terminal device and has reproducibility.

The invention claimed is:
1. A digital device comprising:
a transceiver exchanging information with external devices including at least one main device and at least one cooperation device;
a display displaying visual information;
a sensor detecting a control input and delivering the detected control input to a processor; and
the processor controlling the transceiver, the display, and the sensor that are operably coupled to the processor, wherein the processor:
transmits a first triggering signal for executing a first operation to the main device if the detected control input is intended to execute the first operation and the control input for a first configuration value which is executable using the main device is detected;
detects the cooperation device related to the first operation and provides a notification about the cooperation device if the control input for a second configuration value which is not executable using the main device only is detected; and
detects the cooperation device on the basis of operation attributes of the first operation.

2. The digital device according to claim 1, wherein the processor further transmits the first triggering signal for executing the first operation to the main device if the cooperation device is detected, and further transmits a second triggering signal related to the first operation to the cooperation device.

3. The digital device according to claim 2, wherein the main device that has received the first triggering signal and the cooperation device that has received the second triggering signal simultaneously execute the first operation on the basis of the second configuration value.

4. The digital device according to claim 2, wherein the main device that has received the first triggering signal executes the first operation, and the cooperation device that has received the second triggering signal executes a second operation which is a sub-operation of the first operation and is executed based on the second configuration value.

5. The digital device according to claim 4, wherein the processor receives surrounding environment sensing information on the second configuration value from at least one of the main device and the cooperation device.

6. The digital device according to claim 5, wherein the processor transmits a third triggering signal to the cooperation device if the received surrounding environment sensing information satisfies the second configuration value, and the cooperation device ends the second operation if the third triggering signal is received.

7. The digital device according to claim 1, wherein, if a plurality of the cooperation devices related to the first operation are detected, the processor provides a notification for each of the cooperation devices.

8. The digital device according to claim 7, wherein the processor configures a priority for the cooperation devices on the basis of the operation attributes of the first operation and the second configuration value.

9. The digital device according to claim 8, wherein the processor provides the notification on the basis of the priority.

10. The digital device according to claim 7, wherein the processor displays a first interface including visual information on each of the cooperation devices and the main device.

11. The digital device according to claim 10, wherein, if the control input for selecting first visual information on the first one of the cooperation devices is detected from the first interface, the processor transmits the second triggering signal related to the first operation to the first cooperation device.

12. The digital device according to claim 11, wherein the processor ends the display of the first interface if the first operation for the second configuration value is executable using the main device and the first cooperation device.

13. The digital device according to claim 11, wherein the processor further displays a first indicator on the first interface if the first operation for the second configuration value is not executable using the main device and the first cooperation device, the first indicator including recommendation information on the cooperation devices.

14. The digital device according to claim 10, wherein the processor further displays a second interface for controlling a configuration value for the first operation if the control input for executing the first operation is detected.

15. The digital device according to claim 14, wherein the processor further displays a first indicator on the second interface, the first indicator including a configuration value which is executable using the main device only.

16. The digital device according to claim 1, wherein the processor transmits operation information to the main device, and if device information transmitted from the main device is received based on the operation information, detects the cooperation device on the basis of the received device information.

17. The digital device according to claim 1, wherein the notification includes at least one of a voice notification, a text notification, or an image notification.

18. An IoT (Internet of Things) system comprising:
- a digital device comprising a processor for controlling whether to execute an operation by using a triggering signal;
- a main appliance receiving a first triggering signal from the digital device and executing a first operation on the basis of the first triggering signal; and
- a cooperation appliance receiving a second triggering signal related to the first operation from the digital device and executing a second operation on the basis of the second triggering signal, wherein the processor:
transmits the first triggering signal for executing the first operation to the main appliance if the digital device detects a first control input for a first configuration value which is executable using the main appliance;
detects the cooperation appliance and provides a notification about the cooperation appliance if the digital device detects a second control input for a second configuration value which is not executable using the main appliance only; and
detects the cooperation appliance on the basis of operation attributes of the first operation.

19. A method for controlling a digital device, the method comprising:
- detecting a first control input for executing a first operation for a first configuration value which is executable using a main device;
- transmitting a first triggering signal for executing the first operation to the main device on the basis of the first control input;
- detecting a second control input for executing the first operation for a second configuration value which is not executable using the main device only;
- detecting a cooperation device related to the first operation, wherein the cooperation device is detected on the basis of operation attributes of the first operation; and
- providing a notification about the cooperation device.

* * * * *